Jan. 3, 1939.  V. J. SIGODA  2,142,684
TRANSMISSION FOR PINKING MECHANISM
Original Filed Oct. 19, 1935   2 Sheets-Sheet 1
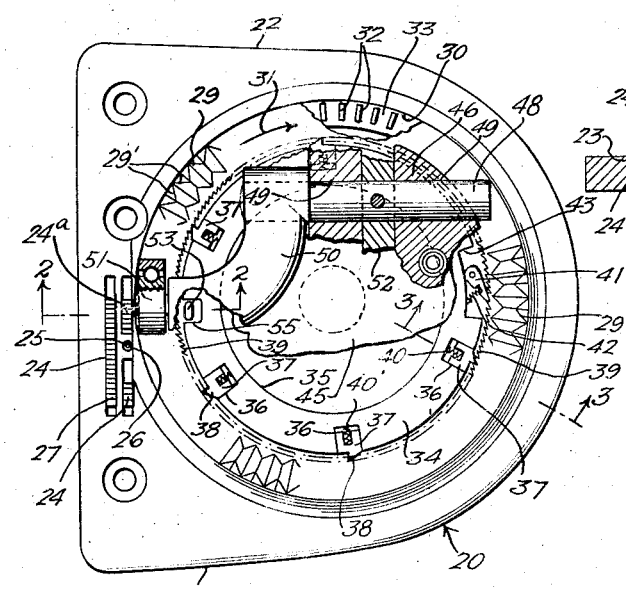
INVENTOR
VICTOR J. SIGODA
BY
ATTORNEY Patented Jan. 3, 1939

2,142,684

UNITED STATES PATENT OFFICE 2,142,684

TRANSMISSION FOR PINKING MECHANISM

Victor J. Sigoda, Brooklyn, N. Y., assignor to Man-Sew Pinking Attachment Corporation, New York, N. Y., a corporation of New York Original application October 19, 1935, Serial No. 45,787. Divided and this application March 15, 1937, Serial No. 130,803

14 Claims. (Cl. 112—220)

My present invention relates to pinking or trimming mechanisms for sewing machines, and the invention has for its object and purpose the provision for such mechanism of an improved power transmission which may be operated by some oscillatory part of the sewing machine such as the feed dog mechanism.

The present application is a division of application for Letters Patent, Serial No. 45,787, filed by me Oct. 19, 1935, for Pinking mechanism for sewing machines.

One of the objects of the invention is the provision in connection with a pinking device of the character described, of power operated transmission which will embody certain desired features of simplicity and convenience and in which the parts are so fashioned and associated that the cost of manufacture of the pinking device including the transmission will be reduced to a minimum. In combination with the pinking device, I have provided several improved forms of the transmission, each especially devised with regard to simplicity of construction, facility in assembly and arrangement, and durability and efficiency in operation.

All forms of the transmission mechanism permit the bottom ring cutter of the pinking device to be mounted in an annular raceway upon very small or fine roller elements. Certain of the transmission mechanisms may take the form of an alternating-movement clutch drive, which may derive its power from the feed dog of the sewing machine and function to drive the ring cutter intermittently in one direction. Another form of the transmission comprises a driving rack upon the feed dog and this is so arranged that the rack teeth will directly engage and move the ring cutter with each feeding movement of the feed dog.

With the above and other objects in view, the invention consists in the improved transmission mechanism and in the form, construction and combination of parts, as well as in the inter-relation and functions thereof, in connection with the driving and driven elements as will be hereinafter more fully described and claimed.

The several simple and commercially practical forms of the invention are disclosed as examples in the accompanying drawings, in which:—

Figure 1 is a top plan view of a pinking device embodying a form of transmission mechanism made in accordance with my invention, parts being broken away and parts being shown in section;

Fig. 2 is a fragmentary vertical sectional view, taken on the line 2—2 of Fig. 1;

Fig. 3 is another fragmentary vertical sectional view taken on the line 3—3 of Fig. 1;

Fig. 4 is a top plan view of the feed dog shown in Figs. 1 and 2;

Fig. 5 is a fragmentary vertical sectional view showing a feed dog constructed with relatively movable rack members for engaging with teeth on the underface of the ring element;

Fig. 6 is a top plan view of the feed dog shown in Fig. 5 in connection with a portion of the ring element shown in broken lines;

Fig. 7 is a vertical sectional view taken on the line 7—7 of Fig. 5;

Figure 8:
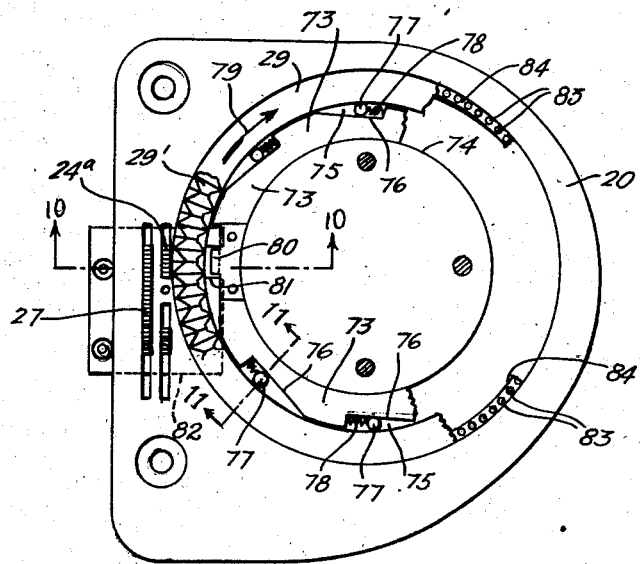
Fig. 8 is a view similar to Fig. 1, but illustrating another form of clutch by which to drive the ring element intermittently in the same direction.

With more particular reference to the accompanying drawings, and first to Figs. 1 to 4, inclusive, my invention for purposes of illustration is shown in connection with a base plate 20 having, with respect to the operator of the sewing machine, a front edge 21 and a rear edge 22, and this plate includes at the left hand end thereof an integral throat or needle plate portion 23 having the usual throat openings 24 and a needle opening 25. This base plate with its integral throat or needle plate is devised to take the place of the usual throat or needle plate which is customarily found upon or recessed in the bed plate of a sewing machine. The base plate 20 may thus be secured upon the bed plate of the sewing machine to replace the usual throat or needle plate and in such manner that the stitching mechanism comprising a needle 26 will operate in the usual way through the needle opening 25 and so that the usual feed racks 24a and 27 rising upwardly from feed mechanism comprising a feed dog 28 will function in the throat openings 24 for giving the work the usual straightaway feed across the throat plate portion 23 in a direction from the front edge 21 toward the rear edge 22. The feed mechanism or dog 28 oscillates with the well-known four-motion action so that during the feeding strokes thereof the feed racks 24a and 27 functioning in the openings 24 will advance the work with an intermittent feeding movement forwardly toward the rear edge 22 of the integral throat plate portion 23.

The pinking device includes a circular closed pinking ring 29 which is disposed in an annular race 30 provided in the base plate; and the top of this ring throughout its entire circular extent is formed with upwardly faced or presented cutting teeth 29' of predetermined design. This circular closed pinking ring serves as a bottom cutter whereby to trim the work being fed by the feed mechanism and just after the work has been stitched by the stitching mechanism.

According to my invention motion is communicated from the four-motion oscillation action of the feed dog for bodily revolving the pinking ring in its race and in the direction indicated by the arrow 31. Any suitable anti-friction means may be employed for supporting the ring for revolving movement in its race, and for this purpose I disclose in the present embodiment a circular series of very small or fine bearing rollers 32 contained in a suitable roller bearing retainer 33 and disposed in the race underneath the ring closely adjacent to the outer peripheral edge thereof, and it will be noted in this connection that the cutting teeth 29' on the top of the ring extend to the outer peripheral edge of the ring. By thus supporting the ring on anti-friction bearing means located below the cutting teeth and as closely as possible to the outer peripheral edge of the ring, the mechanical pressing force which is exerted downwardly upon the upwardly presented teeth for trimming work thereon, as will be presently referred to, is imposed directly upon the anti-friction means which supports the ring for bodily rotation thus preventing possible distortion of the ring.

The transmission mechanism for revolving the ring in the direction of the arrow 31 includes, in the form of construction under consideration, a circular closed clutch ring 34 which is disposed in an annular inner concentric race 35 provided in the base plate 20. At equi-spaced intervals, the clutch ring 34 is provided with recesses 36 extending radially inwardly from its outer circumferences. Slidably disposed in each of these recesses for radial movement is a dog or detent 37 having a tooth 38 adapted to engage with the ratchet teeth 39 provided for the purpose on the inner periphery of the pinking ring 29. This circular series of ratchet teeth and cooperating dogs are so arranged that when oscillating back-and-forth motion is given to the clutch ring 34 intermittent revolving motion in the direction of the arrow 31 will be imparted to the pinking ring. Each of the dogs 37 is urged radially outwardly by a spring member 40 arranged in the recess 36 and acting outwardly on the dog. The arrangement of the ratchet teeth 39 and of the toothed dogs is such that when the clutch ring is moved reversely the teeth on the dogs will slide over the ratchet teeth. Means are provided to positively prevent any reverse movement of the pinking ring with the reverse movement of the clutch ring, and consists of a pivoted pawl 41 which is urged outwardly by a spring 42 whereby to engage the pawl point with the ratchet teeth 39, the arrangement obviously being such that during the turning of the pinking ring in the direction of the arrow 31 the pawl point will slip over the ratchet teeth. To provide clearance for the pawl 41 and its actuating movements, the clutch ring is suitably cut away at 43. With this transmission arrangement, through oscillating back and forth movements of the clutch ring, the pinking ring will be revolved intermittently in the direction of the arrow 31.

The clutch ring with its associated transmission parts together with the plain inner marginal portion 44 of the pinking ring, that is to say, that top portion of the pinking ring which lies inwardly of the raised upwardly faced cutting teeth, are covered by the circular marginal portion of a plate 45 in conjunction with the circular marginal portion of a casting body or superstructure 46; said plate and said superstructure being fixed to the base plate and meeting in tight contact along their straight inner edges, each of these parts having, as shown in plan in Fig. 1, the shape substantially of a half moon.

Manually operated pressing means comprising a vertically rockable presser frame is provided; said means consisting of a rock shaft 48 which is rockably journaled in bearings 49 provided in the rear portion of the body; an overhanging arm 50 fixed at one end to the rock shaft and which carries at its outer end above the teeth of the pinking wheel a rotatable presser roller element 51; and operating means in the form of a lever or actuator 52 secured to the rock shaft and which moves vertically in a suitable groove in the superstructure.

At this point, it may be observed that the arc of the orbit where the pinking ring makes its nearest approach to the seam stitched by the needle 26, is extremely close to that particular feed rack which, being herein particularly designated for identification as 24a, is located in straightaway alignment with the needle opening 25 at the rear thereof; and further that the overhanging arm 50 carries the roller 51 in such position that it will make pressure upon the cutting teeth at such point of nearest approach of the ring to the seam. This arrangement makes it possible for the work to be trimmed substantially instantaneously after the stitching thereof and very close to the line of stitching.

A driving connection is provided between the four-motion oscillation action feed dog 28 and the clutch ring 34; this connection consisting in the provision upon the feed dog of an upwardly extending tongue 53 which passes upwardly through a suitable opening 54 in the base plate and has vertical sliding engagement with the walls 55 of a keeper or opening provided for the purpose in the clutch ring. Said tongue 53 is carried by a horizontal portion 56 on the rail 57 which is carried by the feed dog by means of pins 58. Under this arrangement, the clutch is oscillated back and forth in accompaniment with the retracting and forward feeding movements of the feed dog, the tongue 53 sliding vertically between the walls 55 in accompaniment with the up and down movements of the feed dog.

In Figs. 5, 6 and 7, I show a feed dog provided with a plurality of separate independently movable rack fingers 65 by means of which a pinking ring having underneath ratchet teeth 66 may be operated directly by and in accompaniment with the feeding movements of the feed dog. With the use of this rack finger type of feed dog, it will be appreciated that the clutch ring and transmission dogs associated therewith may be entirely eliminated. In Figs. 5 and 6, it will be seen that in order to carry out this arrangement, the circular series of underneath teeth 66 are provided inwardly of the anti-friction bearing means 67 whereon the ring is supported for its revolving movement and which receives the pressing force of the pressing frame. The rack fingers 65 are disposed in parallel relation and mounted at one end on a pin 68 for vertical movement, the free ends of these fingers being toothed as at 69 for engagement with the power-receiving teeth 66 of the pinking wheel. These rack fingers are normally urged upwardly into position for engagement with the teeth 66 by means of individual springs 70 and at the extreme free ends of these fingers there are shoulders 71 adapted to abut against the bottom of the base plate whereby to limit the upwardly urged movements of the fingers at the particular place where they will best interengage with the teeth 66. The pin 68 on which the fingers are vertically movable is provided in an extension 72 of the feed dog. These independently movable feed dog rack fingers afford means for compensating for the difference in angular relation between the radial power-receiving teeth 66 of the pinking ring and the teeth 69 upstanding from the fingers. In other words, the teeth 69 successively come into parallel driving engagement with a single tooth 66 of the pinking ring, to transmit a smooth continuous rotary movement to the ring in synchronism with the feeding movement of the dog. The arrangement also provides for a quiet operation of the pinking ring directly by the feed dog, and it will be understood in this connection that the teeth of the rack fingers operatively engage with the power-receiving teeth of the pinking ring only during the feeding strokes or movements of the feed dog.

Figure 10:
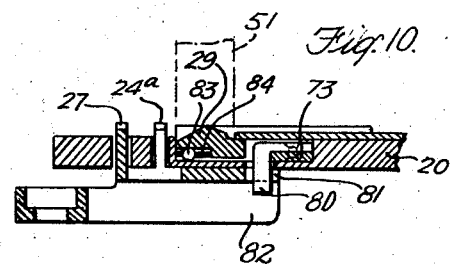
Fig. 10 is a fragmentary vertical sectional view taken on the line 10—10 of Fig. 8, and showing also in broken lines a fragmentary portion of the presser roller.
Figure 9:
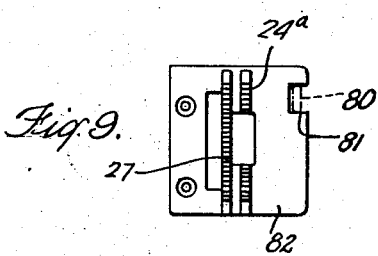
Fig. 9 is a top plan view of the form of feed dog shown in Fig. 8.
Figure 11:
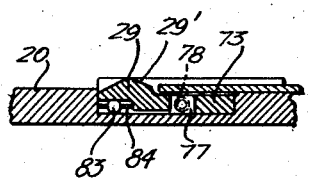
Fig. 11 is a fragmentary sectional view taken on the line 11—11 of Fig. 8.

In Figs. 8, 9, 10 and 11 I show another form of construction for communicating power to the pinking ring, comprising a clutch ring 73 oscillatably disposed in a race 74 provided in the base plate concentrically with the race for the pinking ring. This clutch ring at equi-distant intervals is provided with circumferential recesses 75 having inclined wall portions 76. Within each recess 75 is a ball element 77 and a spring 78 which urges the ball into the narrowing space between the inclined wall portions 76 and the inner plain periphery of the pinking ring. In this arrangement, the recesses with their inclined wall portions 76 are so arranged that when the clutch ring is moved in the circular direction indicated by the arrow 79 the balls through their wedging action will cause the pinking ring to be moved in the same direction, whereas on the reverse movement of the clutch ring, the balls, moving into the widening portions of the recesses, will cease to have wedging action so that the pinking ring will not be moved reversely. In this construction, the clutch ring 73 is represented as being provided with a downwardly extending tongue 80 which fits in a notch or keeper 81 provided for the purpose in the extension 82 of the feed dog. By means of the tongue 80 the clutch ring is given oscillating back and forth movements in accompaniment with the retracting and feeding movements of the feed dog while to compensate for the up and down movements of the feed dog said tongue 80 has sliding fit in the opening 81. In this embodiment of the invention, it will be noted that the pinking ring is mounted upon an anti-friction bearing device consisting of very fine ball bearings 83 contained in a cage 84. This anti-friction bearing device is disposed under the pinking ring at the outer circumferential portion thereof, as shown in Fig. 10.

It is characteristic of the two forms of transmission mechanism, shown in Figs. 1 to 4 and Figs. 8 to 11, respectively, that the oscillatory clutch ring is located within the circle of the pinking ring which encloses it and that between the two rings are located the transmission elements by which the oscillatory movements of the clutch ring are converted into intermittent movements in the same direction on the part of the pinking ring. Through this arrangement which is simple and compact an easy well-balanced driving effect is obtained. The driving force is applied to the pinking ring by direct action engagement, internally thereof and at equi-distant points around the enclosing ring.

In the arrangement shown in Figs. 5 to 7, the drive is by direct action engagement as between the feed dog itself and the driven pinking ring. With each feeding movement of the feed dog, the pinking ring is driven forward, the driving force being applied immediately below the region where the roller 51 exerts downward pressure upon the pinking ring. In all of the forms of construction the pinking ring is revolved quietly and positively with low vibrating effect.

Each of the forms of construction herein disclosed evidences in its simplest form a power operated transmission mechanism by means of which to drive a flat circular closed horizontally disposed pinking cutter of narrow gage between its inner and outer peripheries.

While I have illustrated and described certain preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

I claim:—

1. Transmission mechanism comprising a feed dog having a feed portion, and means carried by the feed dog in relation to said feed portion for mechanically transmitting motion, comprising a plurality of separate independently movable spring-controlled rack fingers adapted to engage with a toothed element to be driven.

2. Transmission mechanism comprising a feed dog having a feed portion, and means carried by the feed dog in relation to said feed portion for mechanically transmitting motion, comprising a plurality of pivoted fingers adapted to be engaged with an element to be driven, said fingers being movable independently of the movement which they have with the feed dog and independently of each other, and compression springs acting on said fingers in one direction.

3. In combination with a four-motion feed dog and an element to be driven therefrom, driving means interposed between and operatively connecting said feed dog with said element and including a plurality of driving members in juxtaposed relation to said element, said element and each of said members having directly coacting means for actuating said element in the feeding movement of the dog, and means for independently maintaining said coacting means in engagement with each other in all positions of the feed dog.

4. In combination with a sewing machine having a reciprocating part, a rotary element, a plurality of individually movable driving members therefor operatively connected with said part for movement as a unit in a path substantially parallel with the plane of rotation of said element, and said element having spaced parts with which said members successively and independently coact in their unitary movement in one direction to impart a succession of rotary impulses to said element, and means yieldingly resisting movement of said members relative to each other and with respect to said part.

5. In combination with a sewing machine having a reciprocating part, a rotary element having radially disposed teeth on one face, and a series of relatively yieldable driving members operatively connected with said part and thereby movable in a path substantially parallel with the plane of rotation of said element and coacting in succession with the teeth in its movement in one direction, to drive said rotary element, said members being independently yieldable relative to the teeth in the movement of said part in the opposite direction.

6. In combination with a sewing machine having a reciprocating part, a rotary element having radially disposed teeth on one face, a series of independently movable driving members for said element arranged in parallel relation and operatively connected with said part for movement as a unit in opposed relation to said teeth, each of said members having a single tooth, and means for successively positioning said members with the tooth of each member in driving contact with one of the teeth on said element in the unitary movement of said members in one direction.

7. In combination with a sewing machine having a reciprocating part, a rotary element having radially disposed teeth on one face, and a plurality of driving members operatively connected with said part for movement as a unit and for independent movement in an angular direction relative to the path of reciprocating movement, said members coacting in succession with said teeth to drive said rotary element in the unitary movement of said members in one direction.

8. In combination with a feed dog, means for transmitting motion therefrom to an element to be driven, comprising a plurality of independently functioning driving members mounted on said feed dog.

9. In combination with a feed dog, means for transmitting motion therefrom to an element to be driven, comprising a plurality of independently functioning driving members pivotally mounted on said feed dog.

10. In combination with a feed dog, means for transmitting motion therefrom to an element to be driven, comprising a plurality of independently functioning driving members mounted for movement as a unit with said dog and for independent movement in an angular direction relative to the path of feeding movement of the dog.

11. In combination with a feed dog, a plurality of driving members pivotally mounted at one of their ends upon said dog, each of said members having means at its other end for direct engagement with an element to be driven thereby.

12. In combination with a rotary element, a four-motion feed dog having a part disposed at one side of said element, a series of driving members mounted upon said part for movement relative thereto into and out of driving engagement with said element, and means acting upon said members to independently and successively effect an operative driving connection between the same and said rotary element in the feeding movement of said dog.

13. In combination with a sewing machine having a reciprocating part, an element mounted to rotate in a horizontal plane, means for transmitting rotation thereto including a series of power transmitting members, means for movably mounting said members upon said reciprocating part, and means for independently and successively moving said members into power transmitting relation with said rotary element in the movement of said part in one direction.

14. In combination with a sewing machine having a reciprocating part, an element mounted to rotate in a horizontal plane, means for transmitting rotation thereto including a series of power transmitting members pivotally connected with said reciprocating part by an axis disposed in parallel relation to the path of movement of said part, and means for independently and successively moving said members into power transmitting relation with said rotary element, in the movement of said part in one direction.

VICTOR J. SIGODA.